United States Patent
Miyashita

(10) Patent No.: US 6,526,276 B1
(45) Date of Patent: Feb. 25, 2003

(54) ELECTRIC FIELD DETECTING METHOD

(75) Inventor: Shinichiro Miyashita, Kanagawa (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 0 days.

(21) Appl. No.: 09/332,763

(22) Filed: Jun. 14, 1999

(30) Foreign Application Priority Data

Jun. 24, 1998 (JP) .......................................... 10-192340

(51) Int. Cl.[7] ................................................. H04Q 7/20
(52) U.S. Cl. ..................... 455/423; 455/67.1; 455/226.2
(58) Field of Search .................................. 455/450, 423, 455/343, 161.2, 161.1, 161.3, 166.1, 67.1, 67.3, 226.1, 226.2; 370/431, 95.1, 464; 379/59; 375/344

(56) References Cited

U.S. PATENT DOCUMENTS

| | | | | |
|---|---|---|---|---|
| 4,013,958 A | * | 3/1977 | Spayth | 325/55 |
| 4,491,975 A | * | 1/1985 | Ito | 455/166 |
| 5,117,424 A | * | 5/1992 | Cohen et al. | 370/105.5 |
| 5,278,835 A | * | 1/1994 | Ito et al. | 370/95.3 |
| 5,371,783 A | * | 12/1994 | Rose et al. | 379/61 |
| 5,404,374 A | * | 4/1995 | Mullins et al. | 375/200 |
| 5,428,826 A | * | 6/1995 | Masaki | 455/161.2 |
| 5,606,741 A | * | 2/1997 | Yamamoto | 455/343 |
| 5,606,742 A | * | 2/1997 | Kido | 455/343 |
| 5,754,586 A | * | 5/1998 | Carsello | 375/213 |
| 5,754,956 A | | 5/1998 | Abreu et al. | 455/434 |
| 5,761,240 A | | 6/1998 | Croucher, Jr. | 375/224 |
| 6,052,419 A | * | 4/2000 | Hioki | 375/344 |

FOREIGN PATENT DOCUMENTS

AT    0967813 A2 * 12/1999    ............ H04Q/7/32

* cited by examiner

*Primary Examiner*—Thanh Cong Le
*Assistant Examiner*—C. Chow
(74) *Attorney, Agent, or Firm*—Pearne & Gordon LLP

(57) ABSTRACT

In a broadcasting channel receiving system of cellular radio telephone system, a signal received through an antenna 5 is demodulated with a carrier frequency formed by a frequency synthesizer 2 in a demodulator 4, and the output of the latter 4 is applied to a signal receiver 3. In response to a request from a CPU 1, the signal receiver 3 applies the measurement result to the CPU 1. The CPU 1 performs the timing control of the receiving system. The CPU controls the timing of the signal receiver so that the measurement of receiving electric fields of a plurality of frequencies is repeated for every predetermined period of time which is shorter than the period of time of the burst transmission which the base station carries out every predetermined period of time.

6 Claims, 5 Drawing Sheets

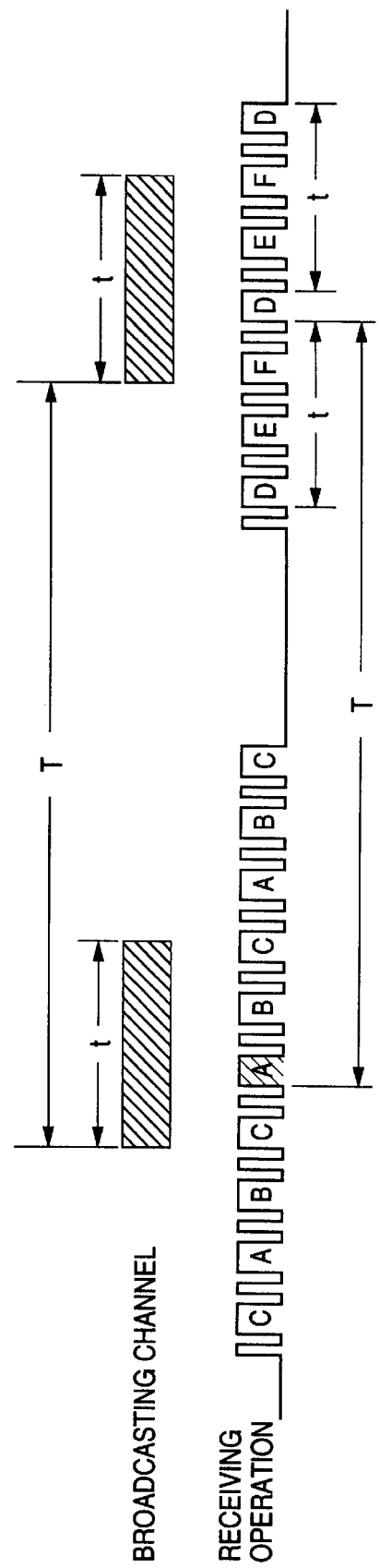

ELECTRIC FIELD DETECTING METHOD

BACKGROUND OF THE INVENTION

This invention relates to a digital cellular radio telephone system such as a portable telephone system, and more particularly to an electric field detecting method.

A system is known as a cellular radio telephone system in the art in which, in order for a mobile unit to detect a net work, a broadcasting channel transmitted from a base station does not perform a continuous signal transmission, but performs a repetitive burst signal transmission with a pre-determined period. In the system, the mobile unit detects the channel is as follows:

FIG. 2 shows an example of the system in which a base station repetitively performs a broadcasting channel burst transmission. In the system, for the same period of time as the burst transmission repetitive period (T), the mobile unit performs a signal receiving operation, thus receiving a broadcasting channel as much as one burst. This is carried out for each of the broadcasting channel prospective frequencies. Usually, the strongest electric field is selected as a broadcasting channel to be received.

However, the above-described conventional method suffers from the following problem: In the case where there are many broadcasting prospective frequencies, or the period of the broadcasting channel burst transmission is long, the signal reception of all the prospective frequencies takes a long period of time.

SUMMARY OF THE INVENTION

Accordingly, an object of this invention is to provide an electric field detecting method in which, even if the number of broadcasting prospective frequencies are large or the period of the broadcasting channel burst transmission is long, the period of time required for receiving all the prospective frequencies is shortened.

In order to achieve the foregoing object of the invention, in a broadcasting channel receiving system of cellular radio telephone system, according to the invention, a processor is provided which controls the timing of transmitting control data to a frequency synthesizer and the timing of controlling a signal receiver, and a plurality of frequencies are repeatedly received for every period of time which is shorter than a period of time for which a base station transmits a burst at predetermined time intervals.

Hence, as many receiving fields as the number of repetitive frequencies can be detected at the same time. This feature decreases a period of time required for receiving all the prospective frequencies.

More specifically, according to first aspect of the invention, it is provided an electric field detecting method in which, in detecting a broadcasting channel which is transmitted every predetermined period of time, measurement of receiving electric fields of a plurality of frequencies is repeated for a period of time which is shorter than a period of time of a burst transmission which is carried out by a base station, thereby to decrease a broadcasting channel detecting time. That is, the method has a function of decreasing the broadcasting channel detecting time.

According to the second aspect of the invention, in the electric field detecting method, the period of repetition of the measurement of the receiving electric fields of the plurality of frequencies is made equal to the period of time of the burst transmission which is carried out by the base station, thereby to maximize a receiving electric field measurement efficiency with a limitation that no broadcasting channel detection leakage occurs. That is, the method has a function of maximizing the receiving electric field measurement efficiency to with a limitation that no broadcasting channel detection leakage occurs.

According to the third aspect of the invention, in the electric field detecting method, in the case where the burst position of a broadcasting channel occurs at the middle of a detection period-of-time, in order to prevent a broadcasting channel detection leakage, signal reception data are stored in memory until reception of the following same frequency, and a receiving electric field detection is carried out in combination with reception of the following same frequency. That is, the method has a function of preventing the broadcasting channel detection leakage in the case where the burst position of the broadcasting channel occurs at the middle of the detection period-of-time.

According to the fourth aspect of the invention, in the electric field detecting method, in the case where the burst position of a broadcasting position occurs at the middle of a detection period-of-time, in order to prevent a broadcasting channel detection leakage, and to reduce the consumption of memory, the number of frequencies for repetition of a receiving electric field measurement is set to a value which is obtained by subtracting one from the maximum number that one cycle does not exceed the burst transmission period-of-time. That is, the method has a function of preventing the broadcasting channel detection leakage, and reducing the consumption of memory.

According to the fifth aspect of the invention, the electric field detecting method in which, after a broadcasting channel transmission burst is detected with a frequency, the approximate position of the transmission burst is estimated, and, only during that period, a signal receiving operation is carried out, whereby the signal receiver is decreased in operation ratio. That is, the method has a function of decreasing the operation ratio of the signal receiver.

According to the present invention, it is provided a broadcasting channel receiving system of cellular radio telephone system, in which a processor is provided which controls the timing of transmitting control data to a frequency synthesizer, and the timing of controlling a signal receiver, and a plurality of frequencies are repeatedly received for every period of time which is shorter than a period of time for which a base station transmits a burst at predetermined time intervals. That is, the system has a function of decreasing the broadcasting channel detection time.

The nature, utility and principle of the invention will be more clearly understood from the following detailed description and the appended claims when read in conjunction with the accompanying drawings.

BRIEF DESCRIPTION OF THE DRAWING(S)

In the accompanying drawings:

FIG. 7 is a diagram indicating the timing of detecting a burst by a signal receiving operation in a fourth embodiment of the invention.

DETAILED DESCRIPTION OF THE INVENTION

Preferred embodiments of the invention will be described with reference to the accompanying drawings. The invention concerns a cellular radio telephone system in which the broadcasting channel does not perform a continuous signal transmission, but performs a repetitive burst transmission with a predetermined period.

First Embodiment

Figure 1:
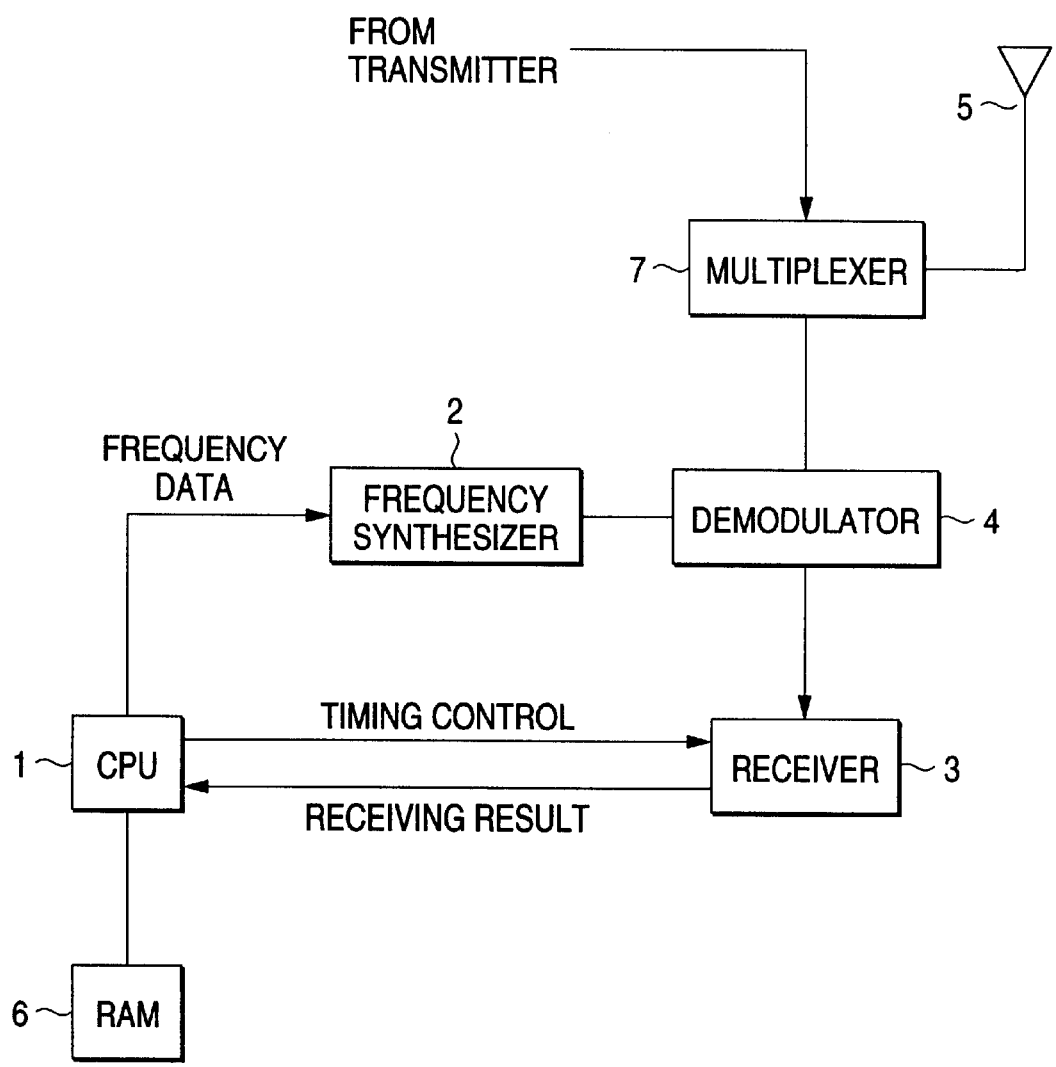
FIG. 1 is a block diagram showing a signal receiving system for realizing an electric field detecting method according to the invention.
Figure 2:
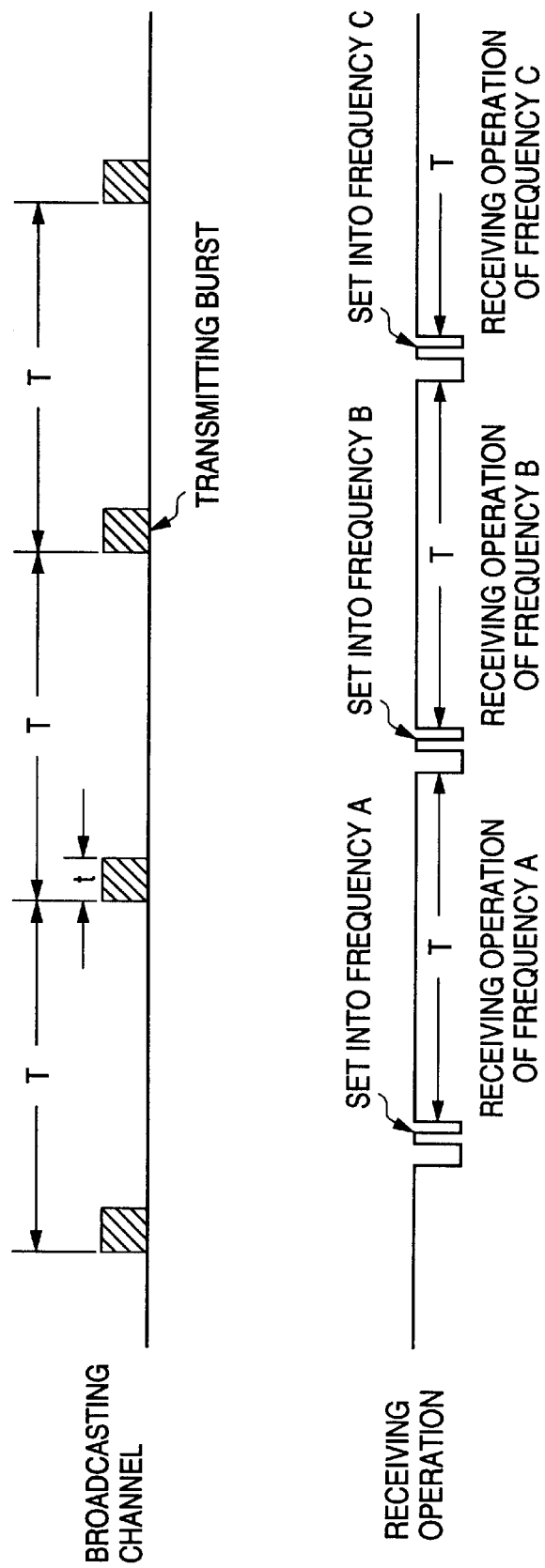
FIG. 2 is a diagram showing an example of a broadcasting channel which is transmitted in a non-continuous mode, and the timing of a conventional signal receiving operation.

Let us consider a broadcasting channel detecting procedure by using a signal receiver 3 (shown in FIG. 1) in a cellular radio telephone system in which, as shown in FIG. 2, a broadcasting channel burst transmission is effected. In the broadcasting channel receiving system of cellular radio telephone system, as shown in FIG. 1, a signal received through an antenna 5 is demodulated with a carrier frequency formed by a frequency synthesizer 2 in a demodulator 4, and the output of the latter 4 is applied to a signal receiver 3. In response to a request from a CPU 1, the signal receiver 3 gives the measurement result to the CPU 1. The CPU 1 performs the timing control of the receiving system. The CPU 1 controls the timing of the signal receiver so that the measurement of the receiving electric field of a plurality of frequencies is repeated for every predetermined period of time which is shorter than the period of time of the burst transmission which the base station carries out every predetermined period of time. The CPU 1 controls the operations of the frequency synthesizer 2 and the signal receiver 3, to cause the signal receiver to detect the electric field and receives the result of detection.

On the other hand, heretofore, all prospective frequencies are received at broadcasting channel transmission burst intervals T, and only in the case where the frequency thus received agrees with the broadcasting channel, the transmission burst electric field is detected. However, in the case where only the electric field is detected, usually it is unnecessary to receive all the transmission bursts.

Figure 3:
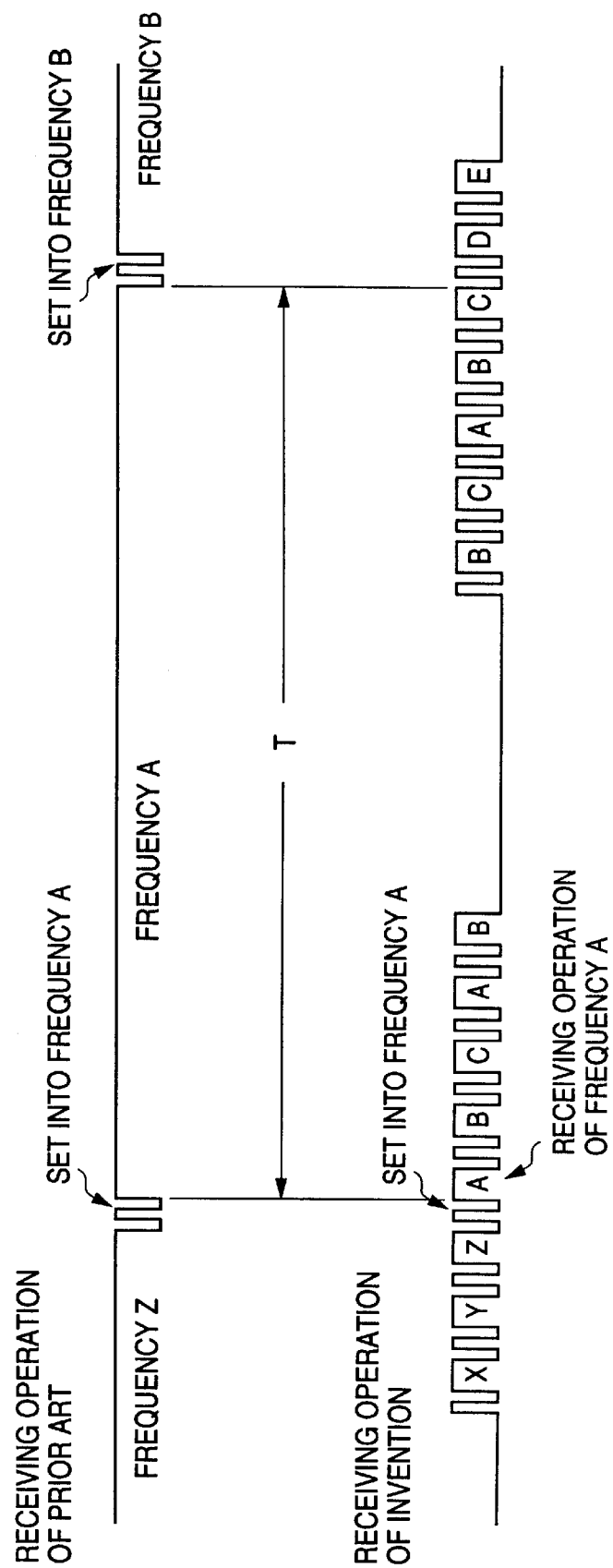
FIG. 3 is a diagram showing comparison between a conventional signal receiving operation and a signal receiving operation of the invention.
Figure 4:
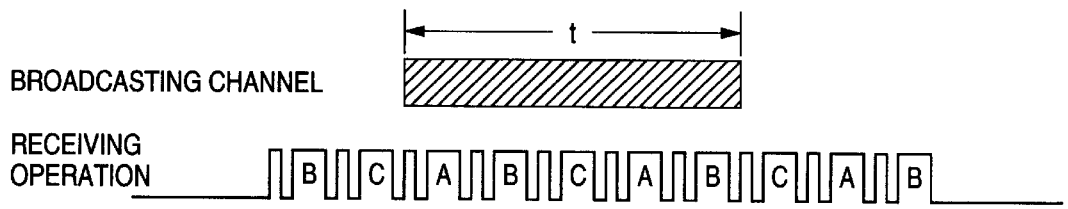
FIG. 4 is a diagram indicating the timing of detecting a burst by a signal receiving operation in a first embodiment of the invention.

Hence, as shown in FIG. 3, a signal receiving operation for a short period of time required for detection of the electric field is repeatedly carried out for a plurality of frequencies. If, in this case, the repetitive period of a frequency to be received is shorter than the burst transmission period-of-time as shown in FIG. 4, then in the case where the broadcasting channel is received with the timing of the transmission burst, the electric field can be detected.

According to this method, the detection time can be reduced to 1/N, where N is the number of the frequencies which are repeated for the same burst transmission period-of-time.

As was described above, in the first embodiment, in the burst detection of the broadcasting channel which is transmitted every predetermined period-of-time, measurement of the receiving electric fields of a plurality of frequencies is repeatedly carried out every period-of-time which is shorter than the burst transmission period-of-time which occurs with the base station every predetermined time. This feature makes it possible to decrease the broadcasting channel detection time.

Second Embodiment

However, the above-described first embodiment suffers from the following problem: If the repetitive channel number is large, and the signal reception interval of one and the same frequency is longer than the burst transmission time t, then a broadcasting channel detection leakage may occur. However, if, as shown in FIG. 5, the repetitive number-of-times which is equal to the burst transmission time t of the base station is selected, then the receiving electric field measurement efficiency can be maximized with a limitation that no broadcasting channel detection leakage does occurs.

Figure 5:
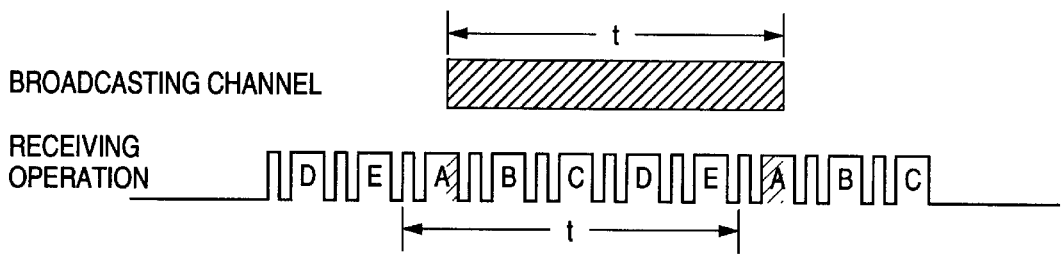
FIG. 5 is a diagram indicating the timing of detecting a burst by a signal receiving operation in a second embodiment of the invention.

However, in the case where, in FIG. 5, the broadcasting channel frequency is A, and the timing of the broadcasting channel transmission burst is as shown, then the burst is detected after the signal receiving operation has been started. In this case, in the next signal receiving operation, too, the burst must be detected; however, the detection is ended halfway. Therefore, both are of incomplete burst, and the broadcasting channel detection leakage may occurs.

This difficulty may be eliminated by the following method: That is, the result of a signal reception with a broadcasting channel (for instance, A) is stored in the RAM 6 until the signal reception is carried out with the same broadcasting channel (A). Thereafter, by judging the results of the two signal receptions, at least the burst of one signal receiving operation period-of-time can be detected; that is, the broadcasting channel detecting leakage can be prevented.

In the second embodiment, the period with which the measurement of the receiving electric fields of a plurality of frequencies is repeated is made equal to the burst transmitting period-of-time of the base station. Hence, the signal reception electric field measurement efficiency can be maximized with a limitation that no broadcasting channel detection leakage occurs.

In the second embodiment, the signal reception data are stored in memory until the same frequency is received next, so that the receiving electric field is detected in combination with the signal reception of the same frequency. Hence, the second embodiment has an effect that, in the case where the broadcasting channel burst position is at the middle of the detection period-of-time, the broadcasting channel detection leakage is prevented.

Third Embodiment

The above-described second embodiment of the invention concerns the method in which the receiving electric field measurement efficiency is maximized to prevent the broadcasting channel detecting leakage. However, the method suffers from the following problem: That is, in the method, it is necessary to store signal reception data for each of the received frequencies, so that the memory consumption is much.

It is assumed that the period of repetition of the frequency receiving electric field measurement is equal to the burst transmission period-of-time of the base station, and the number of repetitive frequencies is N. In this case, in the third embodiment of the invention, the number of repetitive frequencies is set to (N−1). Therefore, even if the burst is detected in the middle of the signal receiving operation, the complete burst can be detected in the following signal receiving operation.

Figure 6:
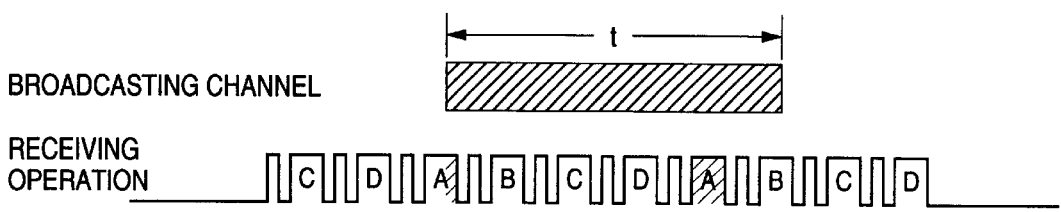
FIG. 6 is a diagram indicating the timing of detecting a burst by a signal receiving operation in a third embodiment of the invention.

It is assumed that, as shown in FIG. 5, the number (N) of repetitive frequencies is five (N=5). In the case where, as shown in FIG. 5, the broadcasting channel frequency is A, and the timing of the broadcasting channel transmission burst is as shown, the burst is detected in the middle of the signal receiving operation. However, if, as shown in FIG. 6, the number of repetitive frequencies is changed from N to N−1, then in the following signal receiving operation, the complete burst can be detected; that is, the broadcasting channel detection leakage can be prevented.

As was described above, in the third embodiment, the number of frequencies of repeating the receiving electric field measurement is set to a value which is obtained by subtracting one (1) from the maximum number with which one cycle does not exceed the burst transmission period-of-time. This feature prevents the broadcasting channel detection leakage in the case where the broadcasting channel burst position is at the middle of the detection period-of-time, and reduces the memory consumption.

Fourth Embodiment

Let us consider the case where, in the cellular radio telephone system in which the broadcasting channel is burst-transmitted as shown in FIG. 2, all the base stations transmit the broadcasting channels substantially at the same burst timing. In the case of the cellular radio telephone system, normally an area exits which has more than two broadcasting channels which can be received, and, according to a factor such as the strength of the receiving electric field, the signal receiver determines a broadcasting channel which is to be received. In this case, when the burst is received which is identified as a broadcasting channel from any one frequency, the burst position of the broadcasting channel having another frequency can be substantially estimated.

It is assumed that, in FIG. 7, a broadcasting channel has been received with a frequency A. If, in this case, a signal receiving operation is carried out as much as the length t of the burst signal before and after the position which is located behind as much as the broadcasting channel burst transmission repetitive frequency T, then the broadcasting channel receiving electric field can be measured, which decreases the operating time of the signal receiver.

As is apparent from the above description, according to the fourth embodiment, after the broadcasting channel transmission burst is detected with a frequency, the approximate position of the transmission burst is estimated, and, only during that period, the signal receiving operation is carried out. Hence, the signal receiver is decreased in operation ratio.

As was described above, in the system in which, in order for the mobile unit to detect the net work, the broadcasting channel transmitted from the base station does not carried out a continuous signal transmission, and instead carries out a repetitive burst transmission with a predetermined period, in detection of a broadcasting channel by the mobile unit the period of time required for receiving all the prospective frequencies is decreased.

While there has been described in connection with the preferred embodiments of the invention, it will be obvious to those skilled in the art that various changes and modifications may be made therein without departing from the invention, and it is aimed, therefore, to cover in the appended claim all such changes and modifications as fall within the true spirit and scope of the invention.

What is claimed is:

1. An electric field detecting method to detect a broadcasting channel which is transmitted every predetermined period of time, comprising the steps of:
repeating measurement of receiving electric fields of a plurality of frequencies for a period of time which is shorter than a period of time of a burst transmission which is carried out by a base station, thereby to decrease a broadcasting channel detecting time.

2. An electric field detecting method as claimed in claim 1, wherein the period of repetition of the measurement of the receiving electric fields of said plurality of frequencies is made equal to the period of time of said burst signal transmission which is carried out by said base station, thereby to maximize a receiving electric field measurement efficiency with a limitation that no broadcasting channel detection leakage occurs.

3. An electric field detecting method as claimed in claim 2, wherein in the case where the burst position of a broadcasting channel occurs at the middle of a detection period-of-time, in order to prevent a broadcasting channel detection leakage, signal reception data are stored in memory until reception of the following same frequency, and a receiving electric field detection is carried out in combination with reception of said following same frequency.

4. An electric field detecting method as claimed in claim 1, wherein in the case where the burst position of a broadcasting position occurs at the middle of a detection period-of-time, in order to prevent a broadcasting channel detection leakage, and to reduce the consumption of memory, the number of frequencies for repetition of a receiving electric field measurement is set to a value which is obtained by subtracting one from the maximum number with which one cycle does not exceed said burst transmission period-of-time.

5. An electric field detecting method as claimed in any one of the claims 1 to 4, wherein after a broadcasting channel transmission burst is detected with a frequency, the approximate position of said transmission burst is estimated, and, only during that period, a signal receiving operation is carried out, whereby said signal receiver is decreased in operation ratio.

6. A broadcasting channel receiving system in a cellular radio telephone system, comprising:
a processor which controls the timing of transmitting control data to a frequency synthesizer and the timing of controlling a signal receiver, and
wherein a plurality of frequencies are repeatedly received for every period of time which is shorter than a period of time for which a base station transmits a burst at predetermined time intervals.

* * * * *

UNITED STATES PATENT AND TRADEMARK OFFICE
CERTIFICATE OF CORRECTION

PATENT NO. : 6,526,276 B1
DATED : February 25, 2003
INVENTOR(S) : Shinichiro Miyashita It is certified that error appears in the above-identified patent and that said Letters Patent is hereby corrected as shown below:

Column 4,
Lines 13 and 16, please delete "time t", and insert therefor -- time $\underline{t}$ --.
Line 21, please delete "A", and insert therefor -- $\underline{A}$ --.
Line 67, please delete "N", and insert therefor -- $\underline{N}$ --.

Column 5,
Line 44, please delete "t", and insert therefor -- $\underline{t}$ --.

Signed and Sealed this

First Day of July, 2003

JAMES E. ROGAN
*Director of the United States Patent and Trademark Office*